June 17, 1952     C. JOHNSON     2,600,777
FOLLOW-UP PRESSURE FLUID SERVOMOTOR
Original Filed June 26, 1944
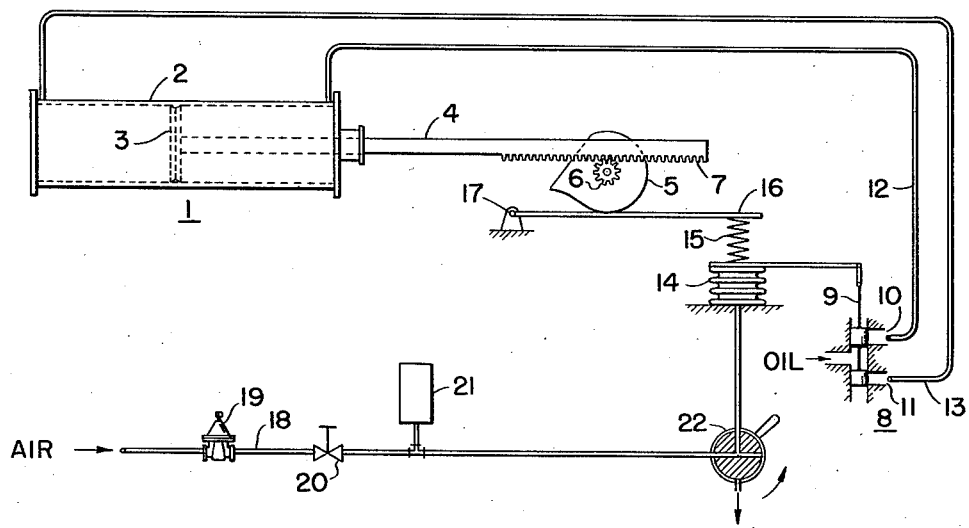
INVENTOR.
CLARENCE JOHNSON
BY Raymond D. Junkins
ATTORNEY Patented June 17, 1952

2,600,777

UNITED STATES PATENT OFFICE 2,600,777

FOLLOW-UP PRESSURE FLUID SERVOMOTOR

Clarence Johnson, South Euclid, Ohio, assignor to Bailey Meter Company, a corporation of Delaware Original application June 26, 1944, Serial No. 542,149. Divided and this application May 29, 1946, Serial No. 672,991

3 Claims. (Cl. 121—41)

This invention relates to control systems and particularly to the controlling of operations in definite relation to time or at a definite time rate. For example, so that a machine part, or the work, moves at a predetermined speed which may be a uniform speed or may be a speed varying in desired relation to time.

A particular object of my invention is to control the rate of movement of a movable part of a machine at a predetermined rate which may be a steady rate or a succession of different rates in sequence or according to a program. For example, I may establish a sequence of movement rates which thereafter are accomplished automatically. In like manner I may establish a sequence of other types of operations, such as pressures, and thereafter accomplish the operations or pressures automatically.

Hydraulic pressure is used to actuate practically every type of metal handling or working machine. The simplicity of this method of applying power lends smoothness of operation and flexibility of control. Certain types of machines require a variety of cutting speeds or feeds, changeable during operation. Presses, resistance welding machines, and the like frequently require sequential operation of different sizes of pistons under different pressures and speed of travel. Shapers, planers, grinders, etc. require rapid approach to the work, slower movement over the work, and a rapid return. All of these examples require sequential operation of one or more parts in relation to time. A particular object of my present invention is to provide a control system providing sequential operation with time, and adapted to a wide variety of machines and operations.

The use of oil as a hydraulic medium provides smooth, vibrationless action that is little affected by load variations, having lubricating value and a minimum of compressibility or corrosion effect. However, oil is subject to change in viscosity with temperature so that an oil having proper viscosity at operating temperature, may thicken excessively when the machine is not used. A changing viscosity as the machine warms up may result in a wide variation in speed of work or tool travel and may require a continual readjustment of what was intended to be an automatic machine or operation. Change in the characteristics of a hydraulic fluid is particularly undesirable in connection with the controls for power cylinders; such as pilot valves and the like. In my present invention I desirably utilize oil as a medium in power cylinders, but use air through- out the control system for such power cylinders. I thus utilize a practically incompressible fluid in the locations where viscosity changes with temperature are of minimum effect; and utilize a fluid which is insensitive to viscosity change with temperature in the control system where volume rates, speeds, directions and the like of the power pistons are established.

In the past, timing operations have been accomplished through the agency of synchronous motors, clockworks and the like as representative of a time function. A particular object of my invention is to provide a fluid pressure timer, and specifically a pneumatic timer. In general, such a time function is accomplished through the application to a moving part of a continuous uniform fluid pressure. One important advantage of such a fluid pressure timer is that the time rate may be readily changed by adjustment of the fluid pressure, either by hand or automatically. This is in comparison to the difficulty of changing gear ratios in a timer driven either by an electric motor or by mechanical clockwork or the like. The fluid pressure driven timer of my invention is preferably pneumatic, although it might be hydraulic if desired.

This application is a division of my copending application, Serial No. 542,149, now abandoned.

In the drawing: the figure is a diagrammatic representation of a preferred embodiment of my invention.

In the figure, I illustrate schematically the application of my invention to a power device 1 which may be a hydraulic servo-motor having a cylinder 2, a piston 3, and piston rod 4. I have felt it unnecessary to show the servo-motor 1 embodied in a metal forming or working machine, as such usage is old in the art and is well understood. By way of example I might mention that the piston rod 4 may move a tool, a traveling table, or any movable parts of a machine for performing an operation. For example, it might provide the power means for shears, presses, punches, or the like. It might be used in traveling the bed or table of a shaper, planer, grinder, or the like. It seems unnecessary to enumerate the many places where such a hydraulic servo-motor is now used in material working or forming machines for positioning movable parts relative to stationary parts. Inasmuch as I do not claim to be the first to use hydraulic servo-motors in material forming or working machines, it seems therefore sufficient to show such a servo-motor 1 diagrammatically and to describe how my invention may be applied thereto.

The arrangement illustrated in the figure provides a sequential or program movement of the piston rod 4 in accordance with the dictates of a cam 5 whose shape follows a predetermined profile. The cam 5 is mounted on a center carrying a pinion 6 driven by the rack 7. Axial movement of the piston rod 4 serves to rotate the pinion 6 and cam 5.

For positioning the piston 3 within the cylinder 2 I regulate the application of oil to, or withdrawal therefrom, the cylinder 2 at opposite sides of the piston 3. For such regulation there is provided a valve generally indicated at 8.

Oil under substantially uniform pressure is available at the left-hand side of the valve assembly 8 as indicated by an arrow. With the valve stem 9 in the position shown in the figure passage of oil to the ports 10 or 11 is shut off and oil within the cylinder 2 is locked, thereby locking the piston 3 in position.

If the valve stem 9 is raised, then oil under pressure is applied through the pipe 12 to the right-hand end of the cylinder 2 and is discharged through the pipe 13 and port 11 from the left-hand end of the cylinder 2; resulting in a movement of the piston 3 toward the left. Conversely, if the valve stem 9 is moved downwardly the piston 3 is caused to move toward the right. The speed at which the piston 3 moves within the cylinder 2 is determined by the degree of axial movement of the stem 9 and thereby the extent of opening of the ports 10 and 11.

For positioning the valve stem 9 I provide a pneumatic time control comprising the uniform application of pressure to a bellows 14 which is loaded with a spring 15. The otherwise free end of the spring 15 bears against a lever 16 pivoted at 17 and positionable by the contour of the cam 5. The time function is introduced through the gradual and uniform building up of pressure within the bellows 14 over a predetermined period of time.

Air under a uniform pressure is available in the pipe 18 after passing through one or more pressure regulators 19. An adjustable orifice 20 determines the rate at which fluid passes to the bellows 14, and therefore determines the rate at which pressure builds up in the bellows 14 and in a volume chamber 21 communicating with the bellows. It will be appreciated that the volume chamber also acts to delay the building up of pressure supplied to the bellows. The time period for building up the pressure from atmospheric to line pressure may be varied from a predetermined minimum value, determined by the flow rate provided on maximum opening of the orifice and the volume of the space to be filled, to any desired higher value by adjusting the orifice to restrict the flow.

In operation the adjustable orifice 20 would be calibrated so that a given opening would require a predetermined number of seconds or minutes for pressure to build up within the bellows 14 to a predetermined maximum value. This likewise would predetermine the number of seconds or minutes required for a complete travel of the piston 3 from right to left on the drawing.

Assuming that the piston 3 is at an extreme right travel in the cylinder 2, and that a minimum pressure exists within the bellows 14. The adjustable orifice 20 is opened to the graduation dictating a complete travel of the piston 3 from right to left in a predetermined time interval. As pressure builds up within the bellows 14 against the spring 15, the valve stem 9 is raised and allows a greater admission of oil pressure through the pipe 12 and a greater bleed from the pipe 13, thus producing a tendency for the piston 3 to move toward the left. As such movement is accomplished, the cam 5 is rotated against the lever 16, thus varying the loading on the bellows 14 and tending to reposition the valve stem 9 toward its neutral position.

If the profile of the cam 5 is a uniform rise of a steepness corresponding with the rate of admission of pressure through the adjustable orifice 20, then the movement of the piston 3 from right to left would be accomplished in the predetermined time interval smoothly and at a uniform rate.

It is apparent that the profile of the cam 5 may be so designed that portions of the travel of the piston 3 may be at a faster rate than other portions, and in fact there may be time periods of dwell when the piston is not moving while pressure within the bellows 14 builds up a predetermined amount. Thus a program of sequential operation of the piston rod 4 is incorporated in the design of the cam 5. Adjustment of the bleed orifice 20 (the time basis) determines the total time interval during which complete travel of the piston 3 from right to left will occur, and thereby the time interval during which the entire program of sequential operation incorporated in the cam 5 will be accomplished.

I provide a hand actuated 3-way valve 22 in the air line leading to the bellows 14. In the position shown the passage is clear from the adjustable orifice 20 to the bellows 14. When the valve 22 is rotated in a counterclockwise direction by ninety degrees, then both the volume chamber 21 and the bellows 14 discharge to atmosphere. This immediately causes the valve stem 9 to travel downwardly opening the port 10 to the atmosphere and opening the port 11 to the full pressure of the oil supply. Such action immediately drains the cylinder 2 at the right-hand end of the cylinder and admits full pressure of oil to the left-hand end. The result is a back traveling of the piston 3 toward the right at maximum speed. Thus the hand actuated valve 22 provides a ready means for placing the system at the start of its cycle of operation. It is quite apparent that if I wish such cycle of operation to be repeated automatically I may provide a trip mechanism or similar arrangement for switching the valve 22 upon the piston 3 reaching either extreme of its travel.

It is apparent that I may use any hydraulic fluid in this system although I prefer to use air for simplicity, cleanliness in case of leakage, etc.

I have illustrated and described a preferred embodiment of my invention in connection with timers and time function control by way of fluid pressure. There are numerous other embodiments that might be shown but I believe it is unneccessary in order to understand my invention. I do not, however, wish to be limited to the particular embodiment illustrated and described.

What I claim as new, and desire to secure by Letters Patent of the United States, is:

1. Power apparatus comprising, in combination, a hydraulic servo-motor having a piston adapted to perform useful work, a valve for controlling the connection of the opposite ends of said piston to a liquid supply and to exhaust, pressure responsive means for moving said valve in a direction to connect one end of said piston to liquid supply and its other end to exhaust, means including an adjustable orifice for supplying pressure fluid from a source to said pressure responsive means, a volume chamber communicating with said pressure responsive means, a spring opposing operation of said pressure responsive means, and means including a cam driven by said piston for loading said spring.

2. The combination of claim 1 including a valve member adjustable for connecting said volume chamber and said pressure responsive means to atmosphere.

3. Power apparatus comprising, in combination, a hydraulic servo-motor having a piston adapted to perform useful work, a valve for controlling the connection of the opposite ends of said piston to a liquid supply and to exhaust, pressure responsive means for moving said valve in a direction to connect one end of said piston to liquid supply and its other end to exhaust, means for supplying a restricted flow of pressure fluid from a source to said pressure responsive means, a volume chamber communicating with the pressure responsive means, and means actuated by said piston for opposing the movement of the pressure responsive means.

CLARENCE JOHNSON.

REFERENCES CITED

The following references are of record in the file of this patent:

UNITED STATES PATENTS

| Number | Name | Date |
|---|---|---|
| 1,961,343 | Donaldson | June 5, 1934 |
| 2,013,754 | Hanna | Sept. 10, 1935 |
| 2,055,530 | Hallenbeck | Sept. 9, 1936 |
| 2,113,161 | Osborne | Apr. 5, 1938 |
| 2,227,170 | Ziebolz | Dec. 21, 1940 |
| 2,237,038 | Moore | Apr. 1, 1941 |
| 2,291,048 | Lichtenstein | July 28, 1942 |
| 2,324,750 | Wiedmann | July 20, 1943 |
| 2,373,226 | Coates | Apr. 10, 1945 |